(12) United States Patent
Yoshida

(10) Patent No.: US 8,516,657 B2
(45) Date of Patent: Aug. 27, 2013

(54) HINGE DEVICE

(75) Inventor: Masahiro Yoshida, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 366 days.

(21) Appl. No.: 12/681,129

(22) PCT Filed: Oct. 6, 2008

(86) PCT No.: PCT/JP2008/068151
§ 371 (c)(1),
(2), (4) Date: Apr. 28, 2010

(87) PCT Pub. No.: WO2009/044910
PCT Pub. Date: Apr. 9, 2009

(65) Prior Publication Data
US 2010/0205774 A1 Aug. 19, 2010

(30) Foreign Application Priority Data
Oct. 5, 2007 (JP) .................. 2007-262614

(51) Int. Cl.
*E05F 3/20* (2006.01)
*F16D 57/00* (2006.01)

(52) U.S. Cl.
USPC ...... 16/50; 16/54; 16/284; 188/290; 188/293; 188/294; 188/295

(58) Field of Classification Search
USPC .............. 16/343, 337, 241, 54, 50, 284, 82, 16/303, 306, 307, 330, 274, 278; 188/290, 188/293–295; 4/240, 246.1, 236
See application file for complete search history.

(56) References Cited

U.S. PATENT DOCUMENTS

| RE17,759 E | * | 7/1930 | Hubbell | 16/82 |
| 2,790,520 A | * | 4/1957 | Kuhn, Jr. | 188/307 |
| 5,276,945 A | * | 1/1994 | Matsumura | 16/337 |
| 5,697,122 A | * | 12/1997 | Okabe et al. | 16/82 |

(Continued)

FOREIGN PATENT DOCUMENTS

| JP | 6-189872 | 7/1994 |
| JP | 06189872 A | * 7/1994 |

(Continued)

OTHER PUBLICATIONS

International Search Report—PCT/JP2008/068151—Dec. 2, 2008.

(Continued)

*Primary Examiner* — Emily Morgan
(74) *Attorney, Agent, or Firm* — Young & Thompson

(57) ABSTRACT

A hinge device prevents breakage of a structuring part from an increase in an internal pressure during overload. In the hinge device, first and second members are rotatable relative to each other. A case is fixed to either the first or second member, and a shaft body capable of rotating relative to the case is fixed to the other. A first chamber and a second chamber formed between the case and the shaft body are filled with viscous fluid. An orifice between the first and second chambers narrows a flow path for the viscous fluid moving from the first to second chamber, resisting rotation of the shaft body. A space region is provided in the shaft body, with a valve body movably placed therein. When pressure of the first chamber reaches a predetermined level, the valve body moves in the space region to increase the volume of the first chamber.

6 Claims, 12 Drawing Sheets

(56) References Cited

U.S. PATENT DOCUMENTS

| | | | |
|---|---|---|---|
| 5,996,132 A * | 12/1999 | Sorimachi | 4/236 |
| 6,067,667 A * | 5/2000 | Suzuki | 4/246.1 |
| 6,085,384 A * | 7/2000 | Bivens | 16/54 |
| 6,213,881 B1 * | 4/2001 | Sasa et al. | 464/24 |
| 6,913,125 B2 * | 7/2005 | Hayashi | 188/290 |
| 7,322,450 B2 * | 1/2008 | Orita | 188/296 |
| 7,416,063 B2 * | 8/2008 | Araki et al. | 188/296 |
| 8,096,393 B2 * | 1/2012 | Saito et al. | 188/290 |
| 2002/0125087 A1 * | 9/2002 | Namiki et al. | 188/290 |
| 2003/0126717 A1 * | 7/2003 | Iwashita | 16/82 |
| 2003/0150678 A1 * | 8/2003 | Iwashita | 188/296 |
| 2003/0234145 A1 * | 12/2003 | Iwashita | 188/290 |
| 2004/0103746 A1 * | 6/2004 | Anton et al. | 74/574 |
| 2006/0027432 A1 * | 2/2006 | Araki et al. | 188/290 |
| 2006/0282982 A1 * | 12/2006 | Kim et al. | 16/221 |
| 2006/0289257 A1 * | 12/2006 | Orita | 188/290 |
| 2007/0158153 A1 * | 7/2007 | Kanno et al. | 188/290 |
| 2011/0048878 A1 * | 3/2011 | Kanno et al. | 188/290 |

FOREIGN PATENT DOCUMENTS

| | | |
|---|---|---|
| JP | 7-313400 | 12/1995 |
| JP | 8-177928 | 7/1996 |
| JP | 10-184741 | 7/1998 |
| JP | 3339802 | 8/2002 |
| JP | 2002-339648 | 11/2002 |
| JP | 2006-125419 | 5/2006 |
| KR | 10-0251856 | 4/2000 |
| KR | 10-0634119 | 10/2006 |
| WO | WO2005095821 * | 3/2005 |

OTHER PUBLICATIONS

Korean Notification of Reasons for Refusal dated Apr. 23, 2012 in corresponding Korean Patent Application No. 2010-7007313 with English translation of Korean Notification of Reasons for Refusal.

* cited by examiner

CROSS SECTIONAL VIEW
TAKEN ALONG LINE XIA – XIA

CROSS SECTIONAL VIEW
TAKEN ALONG LINE XIB – XIB

HINGE DEVICE

TECHNICAL FIELD

The present invention relates to a hinge device that allows a second member to be opened and closed with respect to a first member, and particularly, to a hinge device that generates a damping force by using the resistance of viscous fluid.

BACKGROUND ART

For example, in order to open or close a toilet seat or a toilet lid with respect to a Western style toilet bowl, a hinge device is provided between the toilet seat or the toilet lid and the Western style toilet bowl. The hinge device includes a cylindrical case, and a shaft body that is inserted into the case and can be rotated relative to the case. One of the case and the shaft body is fixed to the Western style toilet bowl, and the other thereof is fixed to the toilet seat or the toilet lid. When the toilet seat or the toilet lid is rapidly closed, loud sound or a large impact is generated. In order to prevent this, an annular region between the case and the shaft body is filled with viscous fluid that generates a damping force. The annular region is compartmentalized into a high-pressure chamber and a low-pressure chamber in a circumferential direction. An orifice, which narrows a flow passage of the viscous fluid flowing to the low-pressure chamber from the high-pressure chamber, is formed between the high-pressure chamber and the low-pressure chamber so as to be capable of resisting the rotation of the shaft body when the shaft body is rotated in one direction (for example, when the toilet seat or the toilet lid is rotated so as to be closed). When the toilet seat or the toilet lid is rotated so as to be closed, the orifice generates the damping force and softens the impact generated when the toilet seat or the toilet lid is closed (for example, see Patent Document 1).

The hinge device, which generates the damping force by using the orifice, has an advantage of being able to generate the damping force that corresponds to the magnitude of loading. On the other hand, when overloading (forced opening and closing and impulsive opening and closing except loading in normal use) is given, an internal pressure of the high-pressure chamber rises. For this reason, there is a concern that components such as the case and the shaft body are damaged. If the stiffness of the components is increased in order to cope with the overloading, cost is increased.

In order to prevent the damage to the components, the hinge device disclosed in Patent Document 1 is provided with an adjustment valve that releases the internal pressure of the high-pressure chamber. When the pressure in the high-pressure chamber 1 is a usual internal pressure, the adjustment valve 3 is seated on an impact releasing valve 4 due to a spring force of a coil spring 2 as shown in FIG. 16A. Accordingly, the high-pressure chamber 1 and the low-pressure chamber 5 are shut off. Meanwhile, when overloading is applied and the pressure in the high-pressure chamber 1 becomes excessively high pressure, the adjustment valve 3 moves downward against the spring force of the coil spring 2 and is separated from the impact releasing valve 4 as shown in FIG. 16B. Accordingly, the viscous fluid of the high-pressure chamber 1 flows to the low-pressure chamber 5 through the adjustment valve 3. Since the high-pressure chamber 1 is connected with the low-pressure chamber 5 and the internal pressure of the high-pressure chamber 1 decreases, it may be possible to prevent the components from being damaged.

Patent Document 1: Japanese Patent No. 3339802

DISCLOSURE OF INVENTION

Problem to be Solved by the Invention

However, since the impact releasing valve, the adjustment valve, and the coil spring are disposed in a region of the low-pressure chamber, which is filled with the viscous fluid, in the hinge device disclosed in Patent Citation 1, the operation of the adjustment valve is delayed. For this reason, there is a concern that components are damaged before the viscous fluid flows to the low-pressure chamber from the high-pressure chamber.

Accordingly, an object of the invention is to provide a hinge device capable of preventing the damage to components that is caused by the increase of an internal pressure of a high-pressure chamber at the time of overloading.

Means for Solving the Problem

The invention will be described below.

In order to achieve the object, the invention according to claim 1 provides a hinge device that allows a second member to rotate relative to a first member, the hinge device comprising: a case that is fixed to one of the first and second members; a shaft body that is fixed to the other of the first and second members, is at least partially inserted into the case, and is rotatable relative to the case; viscous fluid that is filled in first and second chambers formed between the case and the shaft body; an orifice that narrows a flow passage of the viscous fluid flowing to the second chamber from the first chamber so as to resist relative rotation of the shaft body when the shaft body is rotated relative to the case in one direction; and volume increasing means that increases a volume of the first chamber when a pressure in the first chamber reaches a predetermined pressure.

The invention of claim 2 is characterized in that, in the hinge device according to claim 1, the volume increasing means and a communicating path connected to the first chamber are formed at the shaft body, and the volume increasing means increases a volume of the communicating path when a pressure in the communicating path reaches the predetermined pressure.

The invention of claim 3 is characterized in that, in the hinge device according to claim 1 or 2, the volume increasing means includes a valve body that is disposed in a space region formed at one of the case and the shaft body, is movable in the space region, and faces the viscous fluid filled in the first chamber, and when the pressure in the first chamber reaches the predetermined pressure, the valve body moves in the space region so that the volume of the first chamber increases.

The invention according to claim 4 provides a hinge device that allows a second member to rotate relative to a first member, the hinge device comprising: a case that is fixed to one of the first and second members; a shaft body that is fixed to the other of the first and second members, is at least partially inserted into the case, and is rotatable relative to the case; viscous fluid that is filled in first and second chambers formed between the case and the shaft body; an orifice that narrows a flow passage of the viscous fluid flowing to the second chamber from the first chamber so as to resist relative rotation of the shaft body when the shaft body is rotated relative to the case in one direction; and a valve body that is disposed in a space region formed at one of the case and the shaft body, is movable in the space region, and faces the viscous fluid filled in the first chamber, wherein when a pressure in the first chamber does not reach a predetermined pressure, the valve body shuts off connection between the first and second chambers, and when the pressure in the first chamber reaches the predetermined pressure, the valve body moves in the space region so that a bypass flow passage connecting the first chamber with the second chamber is formed.

The invention of claim 5 is characterized by, in the hinge device according to claim 3 or 4, further including a spring member that is disposed in the space region, the spring member resisting a force that is generated by the pressure in the first chamber and pushes the valve body.

The invention of claim 6 is characterized in that, in the hinge device according to claim 4, when a moving distance of the valve body in the space region is smaller than a predetermined distance, the bypass flow passage does not connect the first chamber with the second chamber, and when the moving distance of the valve body is equal to or larger than the predetermined distance, the bypass flow passage connects the first chamber with the second chamber.

The invention of claim 7 is characterized in that, in the hinge device according to any one of claims 1 to 6, a damping-force generating valve body, which is rotated together with the shaft body, is provided between an inner surface of the case and the shaft body, when the shaft body is rotated relative to the case in the one direction, the shaft body moves the damping-force generating valve body toward the inner surface of the case so that the damping-force generating valve body comes into close contact with the inner surface of the case and the first and second chambers are compartmentalized, and when the shaft body is rotated relative to the case in an opposite direction, the shaft body moves the damping-force generating valve body in a direction where the damping-force generating valve body is separated from the inner surface of the case so that a force of the damping-force generating valve body pushing the inner surface of the case decreases or is lost.

Effects of the Invention

According to the invention of claim 1, when the pressure in the first chamber reaches a predetermined pressure, the volume of the first chamber is increased. For this reason, it may be possible to instantaneously decrease the internal pressure of the first chamber even though the pressure in the first chamber becomes high pressure due to overloading. Further, it may be possible to prevent the increase of the internal pressure of the first chamber by the expansion of the volume of the viscous fluid accompanying a temperature rise as well as overloading.

According to the invention of claim 2, the volume increasing means can increase the volume of the first chamber regardless of the rotation angle of the shaft body relative to the case. In contrast, when the volume increasing means is provided in the case, it may not be possible to increase the volume of the first chamber at a certain rotation angle of the shaft body relative to the case.

According to the invention of claim 3, the valve body is disposed outside a chamber that is filled with the viscous fluid. Accordingly, it may be possible to suppress the deterioration of a response of the valve body that is caused by the viscous resistance of the viscous fluid, or the deviation of the operation of the valve body.

According to the invention of claim 4 or 6, when the pressure in the first chamber reaches a predetermined pressure, the bypass flow passage may connect the first chamber with the second chamber and the volume of the first chamber is increased. For this reason, it may be possible to instantaneously decrease the internal pressure of the first chamber even though the pressure in the first chamber becomes high pressure due to overloading. Further, it may be possible to prevent the increase of the internal pressure of the first chamber by the expansion of the volume of the viscous fluid accompanying a temperature rise as well as overloading. Furthermore, the valve body is disposed outside a chamber that is filled with the viscous fluid. Accordingly, it may be possible to suppress the deterioration of a response of the valve body that is caused by the viscous resistance of the viscous fluid, or the deviation of the operation of the valve body.

According to the invention of claim 5, it may be possible to effectively utilize the space region.

According to the invention of claim 7, when the shaft body is rotated in one direction, the damping-force generating valve bodies can compartmentalize the first and second chambers, so that a damper is made ON. Accordingly, a braking force may be generated. Meanwhile, when the shaft body is rotated in the other direction, forces of the damping-force generating valve bodies pushing the inner surface of the case decrease or are lost. Accordingly, it may be possible to rotate the shaft body relative the case with a small force.

EXPLANATION OF REFERENCES 11, 41, 51: CASE
12, 42, 52: SHAFT BODY
14a, 43a, 54a: FIRST CHAMBER
14b, 43b, 54b: SECOND CHAMBER
16: COLUMNAR VALVE
17: VALVE SUPPORTING PORTION
44, 48: ORIFICE
22c: COMMUNICATING GROOVE (COMMUNICATING PATH)
26: SPACE REGION
28: OVERLOADING PREVENTIVE VALVE (VALVE BODY)
31: COMPRESSION COIL SPRING (SPRING MEMBER)
38: BYPASS FLOW PASSAGE
56: DAMPING-FORCE GENERATING VALVE BODY

BEST MODE FOR CARRYING OUT THE INVENTION

Figure 1:
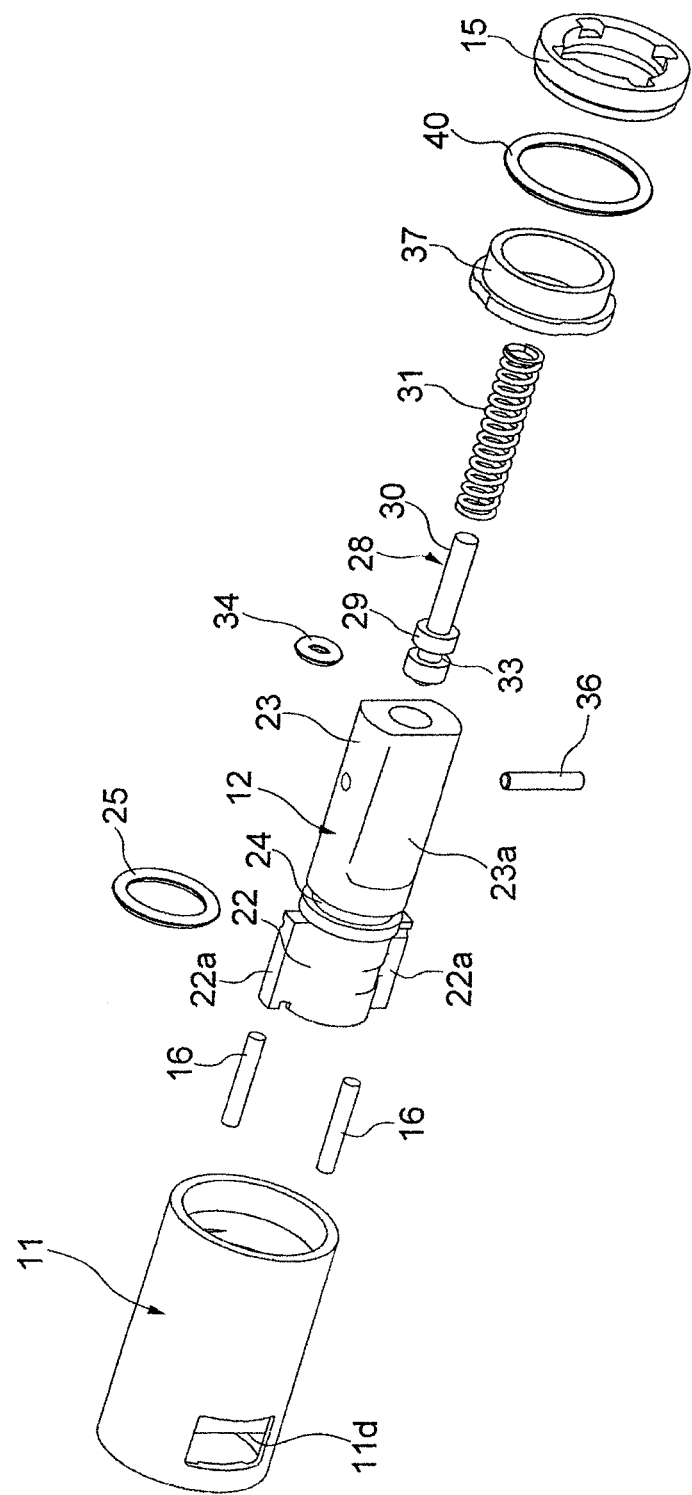
FIG. 1 is an exploded perspective view of a hinge device according to a first embodiment of the invention.

A hinge device according to a first embodiment of the invention will be described below with reference to accompanying drawings. FIG. 1 is an exploded perspective view of the hinge device. The hinge device includes a cylindrical case 11 and a shaft body 12 that is partially inserted into the case 11 and may be rotated relative to the case 11. The case 11 is fixed to either a first member such as a Western style toilet bowl or a second member such as a toilet seat or toilet lid, and the shaft body 12 is fixed to the other of the first member and the second member. The center line of the case 11 coincides with the center line of the shaft body 12.

The case 11 is formed in a bottomed cylindrical shape. A columnar projection 11a projecting toward the shaft body 12 is formed on a bottom of the case 11 (see FIG. 3). A thread 11c is formed at an open end of the peripheral portion 11b of the case 11. The thread 11c is threadably mounted on a cover nut 15 that is used to assemble the shaft body 12 with the case 11. A mounting hole 11d, which is used to mount the case 11 on the first or second member, is formed in the case 11.

Figure 2:
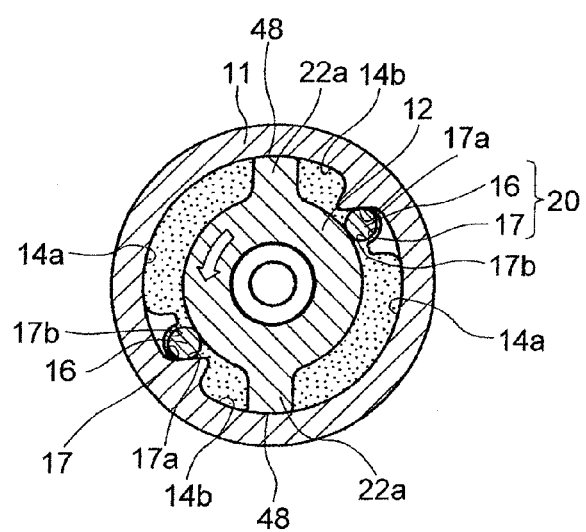
FIG. 2 is a cross-sectional view of the hinge device taken along a line perpendicular to an axis of the hinge device.

As shown in FIG. 2, first chambers 14a on a high-pressure side and second chambers 14b on a low-pressure side, which are filled with viscous fluid, are formed between the inner periphery of the case 11 and the outer periphery of the shaft body 12 (see FIG. 2). Groove-shaped valve supporting portions 17 in which columnar valves 16 are received are formed on the inner peripheral surface of the case 11. The two valve supporting portions 17 are formed at intervals of 180 degrees in a circumferential direction. Each of the valve supporting portions 17 includes a straight inclined wall surface 17a and an arcuate wall surface 17b. Each of the columnar valves 16 is supported by the valve supporting portion 17 so as to be able to slightly move in the valve supporting portion 17.

When the shaft body 12 is rotated in the counter-clockwise direction, the valves 16 come into close contact with the inclined wall surfaces 17a of the case 11 and the shaft body 12 and shut off the flow of the viscous fluid. Meanwhile, when the shaft body 12 is rotated in the clockwise direction, the valves allow the flow of the viscous fluid without coming into close contact with the shaft body 12 and the case 11. The valve 16 and the valve supporting portion 17 constitute a check valve mechanism 20.

That is, when the shaft body 12 is rotated in the counter-clockwise direction, the pressure in the first chamber 14a becomes high pressure and the pressure in the second chamber 14b becomes low pressure. In this case, the columnar valve 16 rises on the straight inclined wall surface 17a, enters a gap between the inclined wall surface 17a and the outer peripheral surface of the shaft body 12 like a wedge, and closes a flow passage of the viscous fluid. Meanwhile, when the shaft body 12 is rotated in the clockwise direction, the viscous fluid flows to the first chamber 14a from the second chamber 14b. Since the columnar valve 16 is only pressed against the arcuate wall surface 17b in this case, the flow passage of the viscous fluid flowing in the first chamber 14a and the second chamber 14b is not closed.

As shown in FIG. 1, an insertion part 22 of the shaft body 12 to be inserted into the case 11 is formed in a substantially columnar shape. Projections 22a, which project in a radial direction, are formed on the outer peripheral surface of the insertion part 22 of the shaft body 12. The projections 22a are formed at intervals of 180 degrees in the circumferential direction and extend in an axial direction of the shaft body 12. When the shaft body 12 is rotated relative to the case 11 as shown in FIG. 2, the viscous fluid flows in a small clearance between the outer peripheral surface of the projection 22a and the inner peripheral surface of the case 11. The clearance, that narrows the flow passage of the viscous fluid flowing to the second chamber 14b from the first chamber 14a, forms an orifice 48. It may be possible to generate a damping force corresponding to the magnitude of loading by forming the orifice 48.

A chamber, which is filled with the viscous fluid, is formed between the inner peripheral surface of the case 11 and the outer peripheral surface of the shaft body 12. This chamber is compartmentalized into the first and second chambers 14a and 14b by the orifices 48 of the case 11 and the projections 22a of the shaft body 12. Since two orifices 48 and two check valve mechanisms 20 are formed in this embodiment, the chamber filled with the viscous fluid is compartmentalized into two first chambers 14a and two second chambers 14b.

Figure 3:
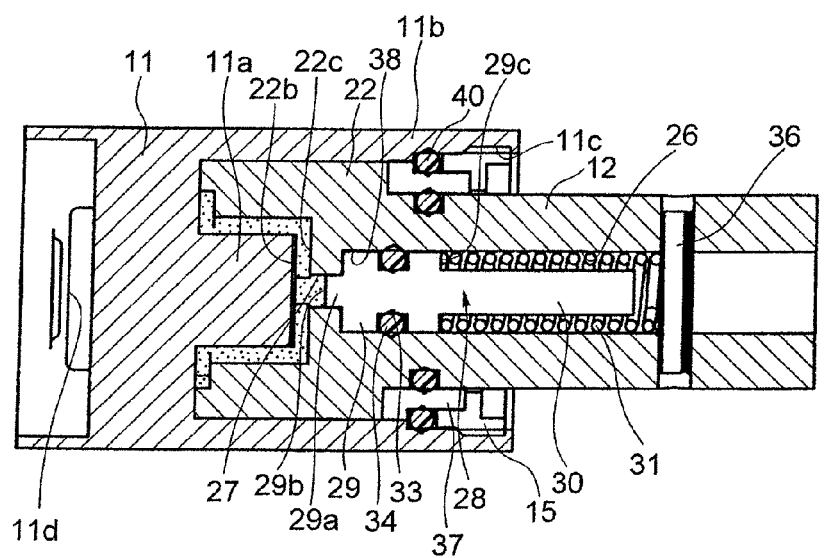
FIG. 3 is a cross-sectional view of the hinge device taken along the axis of the hinge device (a state before the operation of an overloading preventive valve).
Figure 5:
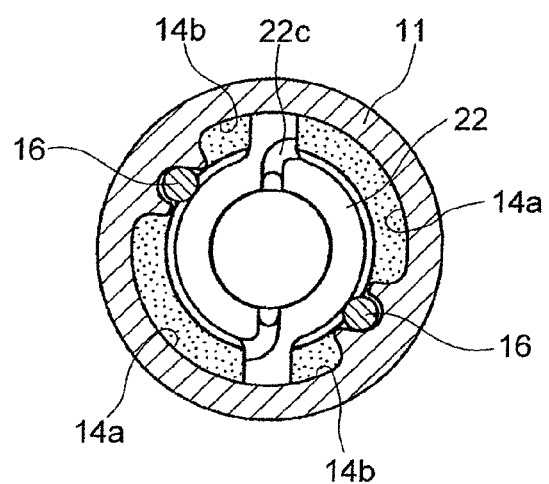
FIG. 5 is a cross-sectional view of the hinge device taken along a line perpendicular to the axis of the hinge device (a view showing a communicating path that makes two first chambers communicate with each other).

A recess 22b, which corresponds to the shape of the columnar projection of the case 11, is formed on the end surface of the insertion part 22 of the shaft body 12 as shown in FIG. 3. When the shaft body 12 is inserted into the case 11, the projection 11a of the case 11 is fitted to the recess 22b of the shaft body 12. Further, a communicating groove 22c, which is a communicating path making the two first chambers 14a communicate with each other, is formed in the recess 22b (see FIGS. 5 and 6).

As shown in FIG. 1, a plurality of flat surfaces 23a is formed on a fitting portion 23 of the shaft body 12 that projects from the case 11. A plurality of flat surfaces, which corresponds to the plurality of flat surfaces 23a of the shaft body 12, is formed on the other of the first member and the second member. Since the fitting portion 23 of the shaft body 12 is fitted to the first or second member, the shaft body 12 is rotated together with the first or second member. A groove 24, which extends in the circumferential direction, is formed between the insertion part 22 and the fitting portion 23 in the axial direction of the shaft body 12. An O-ring 25, which prevents the leak of the viscous fluid filled in the first and second chambers 14a and 14b, is fitted into the groove 24.

A space region 26, which has a bottomed cylindrical shape and extends in the axial direction, is formed at the center of the shaft body 12 as shown in FIG. 3. Further, a through hole 27, which connects the communicating groove 22c with the space region 26, is formed in the shaft body 12. An overloading preventive valve 28, which is a valve body, is disposed in the space region 26 of the shaft body 12 so as to be movable in the axial direction. The overloading preventive valve 28 disposed in the space region 26 functions as volume increasing means that increases the volume of the first chambers 14a. The overloading preventive valve 28 includes a large-diameter portion 29 that has a diameter corresponding to the inner peripheral surface of the space region 26, and a small-diameter portion 30 around which a compression coil spring 31, that is a spring member, is wound. A projection 29a, which is to be fitted into the through hole 27, is formed at one end of the large-diameter portion 29. One end surface 29b of the large-diameter portion 29 faces the viscous fluid filled in the first chambers 14a, and the other end surface 29c thereof faces the space region 26. A groove 33, which extends in the circumferential direction, is formed on the outer peripheral surface of the large-diameter portion 29. An O-ring 34 is fitted into the groove 33. The O-ring 34 prevents the viscous fluid, which is filled in the first chambers 14a, from leaking into the space region 26. The compression coil spring 31 wound around the small-diameter portion 30 pushes the overloading preventive valve 28 toward the first chamber 14a. The compression coil spring 31 is supported by a spring pin 36, which is inserted into the shaft body 12, so as not to fall out.

As shown in FIG. 1, a bearing 37 and a cover nut 15 are mounted on the case 11 in order to prevent the shaft body 12 from falling out from the case 11. The bearing 37 guides the shaft body 12 that is rotated relative to the case 11. An O-ring 40, which prevents the viscous fluid from leaking to the outside, is mounted on the outer periphery of the bearing 37. The cover nut 15 is fastened to the thread 11c that is formed at the open end of the case 11.

As described above, it may be possible to generate a damping force, which corresponds to the magnitude of loading, by forming the orifice 48. On the other hand, when overloading (forced opening and closing and impulsive opening and closing except loading in normal use) is given, an internal pressure of the first chamber 14a rises. For this reason, there is a concern that components such as the case 11 and the shaft body 12 are damaged. An overloading preventive mechanism, which does not generate the damping force for overloading exceeding predetermined loading, is employed in order to prevent the components from being damaged.

In a loading range in normal use, the overloading preventive valve 28 is pressed against the shaft body 12 by the compression coil spring 31 as shown in FIG. 3. Further, the bypass flow passage 38, which connects the first chamber 14a with the second chamber 14b, is shut off. The damping force corresponding to a high output is obtained in this state.

Figure 4:
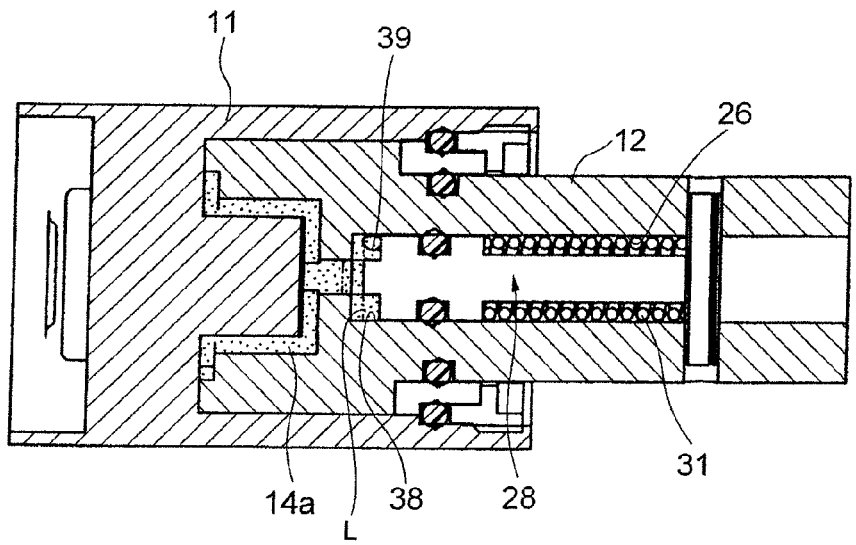
FIG. 4 is a cross-sectional view of the hinge device taken along the axis of the hinge device (a state after the operation of an overloading preventive valve).

When loading exceeds a predetermined value, the internal pressure in the first chamber 14a on the high-pressure side overcomes a reaction force of the compression coil spring 31, so that the overloading preventive valve 28 is pushed toward the compression coil spring 31 as shown in FIG. 4. Accordingly, the overloading preventive valve 28 moves in the space region 26 due to the internal pressure in the first chamber 14a, so that the bypass flow passage 38 connecting the first chamber 14a with the second chamber 14b is formed.

Figure 7:
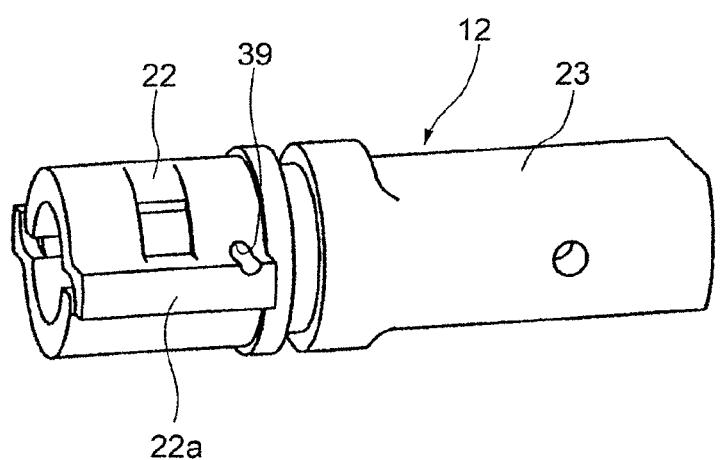
FIG. 7 is a side view of the shaft body.
Figure 8:
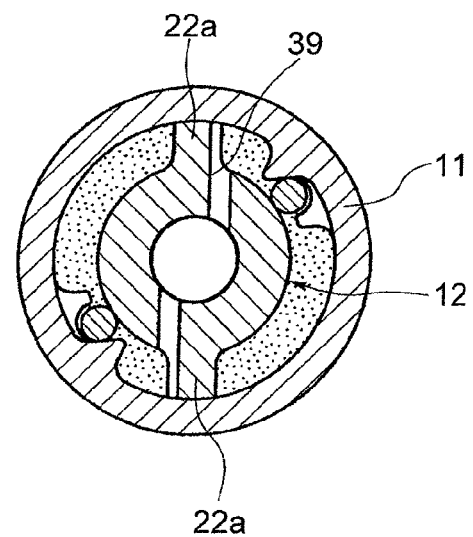
FIG. 8 is a cross-sectional view of the hinge device taken along a line perpendicular to the axis of the hinge device (a view showing a second chamber connecting flow passage).

As shown in FIG. 4, a second chamber connecting flow passage 39 connected to the second chamber 14b is formed on the side of the bypass flow passage 38. As shown in FIGS. 7 and 8, the second chamber connecting flow passage 39 is formed of a through hole that penetrates the shaft body 12 from the inner periphery toward the outer periphery. If the bypass flow passage 38 is formed so that the first chamber 14a is connected with the second chamber 14b, the viscous fluid filled in the first chamber 14a flows to the second chamber 14b via the bypass flow passage 38 and the second chamber connecting flow passage 39. Since a bypass of the flow passage going through the orifice 48 is formed, it may be possible to prevent the pressure in the first chamber 14a from excessively rising due to overloading and to make the damping force correspond to a low output.

Further, since the bypass flow passage 38 is formed, it may be possible to connect the first chamber 14a with the second chamber 14b and to increase the volume of the first chamber 14a (it may be possible to increase the volume of the communicating groove 22c connected to the first chamber 14a, thereby increasing the volume of the first chamber 14a). Since the overloading preventive valve 28 is disposed not in a region that is filled with the viscous fluid but in the space region 26, it may be possible to increase the volume of the first chamber 14a. Since it may be possible to increase the volume of the first chamber 14a, it may be possible to instantaneously decrease the internal pressure of the first chamber 14a even though the pressure in the first chamber 14a becomes high pressure due to overloading.

When the moving distance of the overloading preventive valve 28 in the space region 26 is smaller than a predetermined distance (which is shown by a two-dot chain line L in FIG. 4), the bypass flow passage 38 does not connect the first chamber 14a with the second chamber 14b. Since the overloading preventive valve 28 may be operated in consideration of the expansion of the volume of the viscous fluid that is caused by the temperature rise of the viscous fluid, it may be possible to prevent the formation of the bypass flow passage 38 that is caused by an abnormal operation when the hinge device is used in a high-temperature atmosphere, that is, the temperature rise of the viscous fluid.

Figure 9:
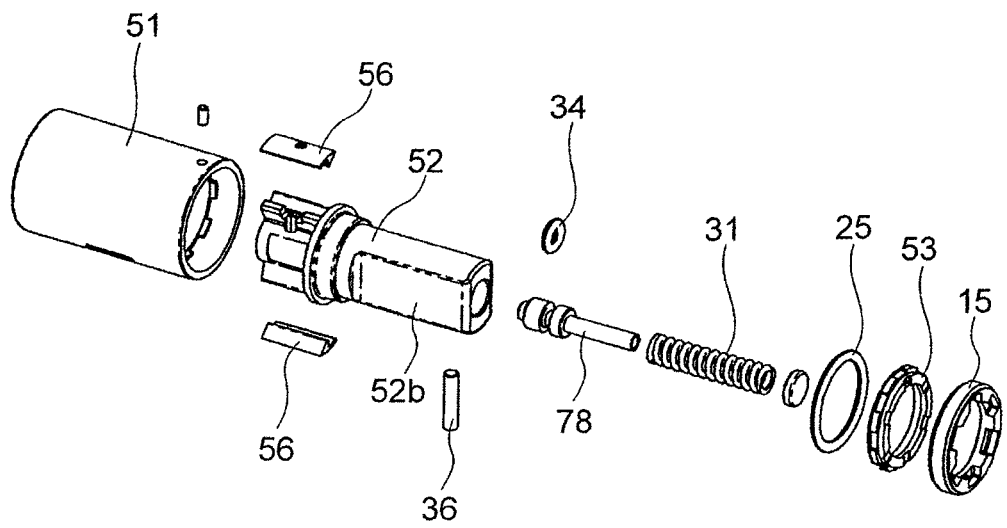
FIG. 9 is an exploded perspective view of a hinge device according to a second embodiment of the invention.

FIG. 9 is an exploded, perspective view showing a hinge device according to a second embodiment of the invention. The hinge device according to the embodiment comprises a cylindrical-shaped case 51 and a shaft body 52 having a part thereof inserted into the case 51 and being capable of rotating relative to the case 51. The case 51 is fixed to either a first member such as a Western style toilet bowl, or a second member such as a toilet seat or toilet lid, and the shaft body 52 is fixed to the other of the first member and the second member. The case 51 is formed to be bottomed cylindrical shaped. A columnar-shaped projection 51a projecting toward the shaft body 52 is formed on a bottom of the case 51 (see FIG. 13A). Formed on the shaft body 52 is a cylindrical-shaped recess 52a (see FIG. 10A), which is fitted onto the columnar-shaped projection 51a. Rotational movement of the shaft body 52 is guided by the projection 51a of the case 51 and a bearing 53 mounted to the case 51.

Figure 11A:
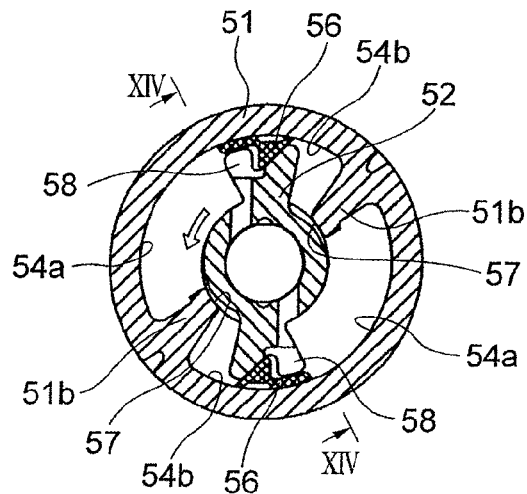
FIGS. 11A and 11B are cross-sectional views of the shaft body taken along a line perpendicular to an axis of the shaft body (FIG. 11A is a cross-sectional view of a portion of a first chamber communicating hole and FIG. 11B is a cross-sectional view of a portion of a second chamber communicating hole).
Figure 11B:
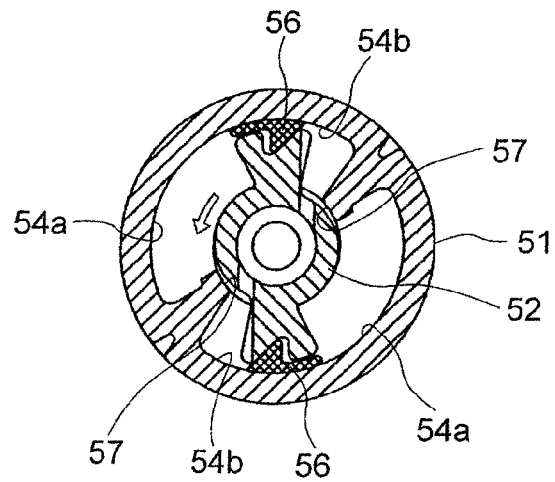

As shown in FIG. 11A, two first chambers 54a and two second chamber 54b that are filled with viscous fluid are formed between the case 51 and the shaft body 52 alternately in a circumferential direction. In the hinge device according to the first embodiment, as shown in FIG. 2, when the shaft body 12 rotates in a counter-clockwise direction being one direction, the first chamber 14a on a high-pressure side and the second chamber 14b on a low-pressure side are compartmentalized by the columnar-shaped valve 16 of the check valve mechanism 20. The viscous fluid flows to the second chamber 14b on the low-pressure side from the first chamber 14a on the high-pressure side via the orifice 48 disposed between the projection 22a of the shaft body 12 and the inner peripheral surface of the case 11. Thereby, a damping force is generated. In contrast, according to the present embodiment, as shown in FIG. 11A, when the shaft body 52 rotates in a counter-clockwise direction being one direction, the first chamber 54a on a high-pressure side and the second chamber 54b on a low-pressure side are compartmentalized by a damping-force generating valve body 56 interposed between the shaft body 52 and an inner peripheral surface of the case 51. The damping-force generating valve body 56 rotates together with the shaft body 52. The viscous fluid flows to the second chamber 54b on the low-pressure side from the first chamber 54a on the high-pressure side via an orifice 57 disposed between a projection 51b, which projects inside the case 51, and a small-diameter portion of the shaft body 52. Thereby, a damping force is generated. When the shaft body 52 rotates in a clockwise direction being the other direction, the first chamber 54a is reversely positioned on the low-pressure side and the second chamber 54b is positioned on the high-pressure side. At this time, the damping-force generating valve body 56 does not compartmentalize the first chamber 54a on the low-pressure side and the second chamber 54b on the high-pressure side from each other. Since the viscous fluid flows to the first chamber 54a on the low-pressure side from the second chamber 54b on the high-pressure side via a notch 58 of the shaft body 52, any damping force is not generated.

Figure 10A:
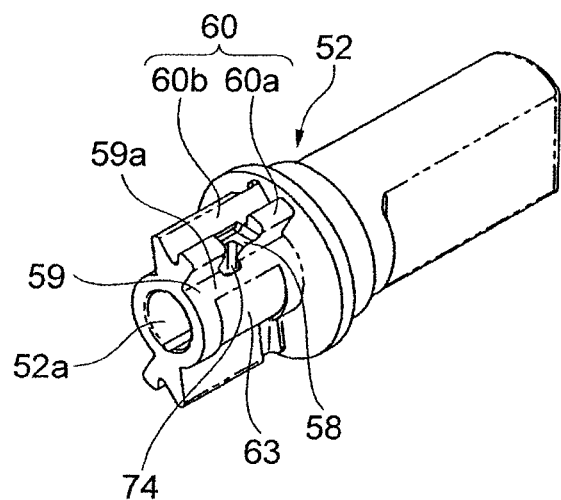
FIGS. 10A and 10B are perspective views of a shaft body (FIG. 10A shows that one piece of a shaft-body fitting portion of the shaft body is directed to the front side and FIG. 10B shows that the other piece of the shaft-body fitting portion is directed to the front side).

As shown in FIG. 10A, formed on an insertion part 59 of the shaft body 52 inserted into the case 51 are a small-diameter portion 59a and valve body engaging portions 60, which are V-shaped in cross section to project radially from the small-diameter portion 59a. The valve body engaging portions 60 are formed two in number to be spaced 180 degrees in a circumferential direction and elongate in an axial direction of the shaft body 52. The damping-force generating valve body 56 is fitted into each of the valve body engaging portions 60. A notch 58, through which the viscous fluid is permitted to flow to the first chamber 54a on the low-pressure side from the second chamber 54b on the high-pressure side, is formed centrally in a longitudinal direction of one piece 60a of the valve body engaging portion 60. A shallow groove 63 defining the orifice 57 is formed in the small-diameter portion 59a of the shaft body 52.

Figure 12A:
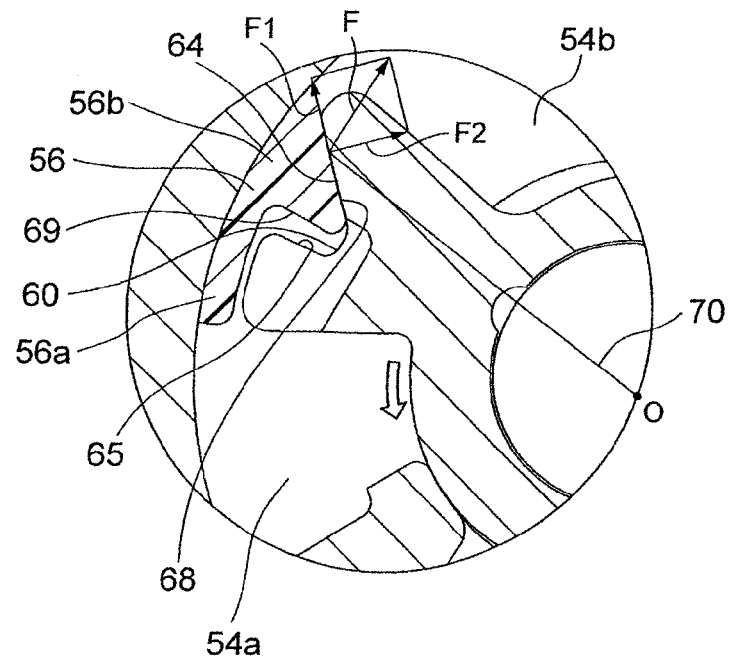
FIGS. 12A and 12B are detailed views each illustrating the operation of the shaft body and the damping-force generating valve body (FIG. 12A shows that the shaft body is rotated in a counter-clockwise direction and FIG. 12B shows that the shaft body is rotated in a clockwise direction).
Figure 12B:
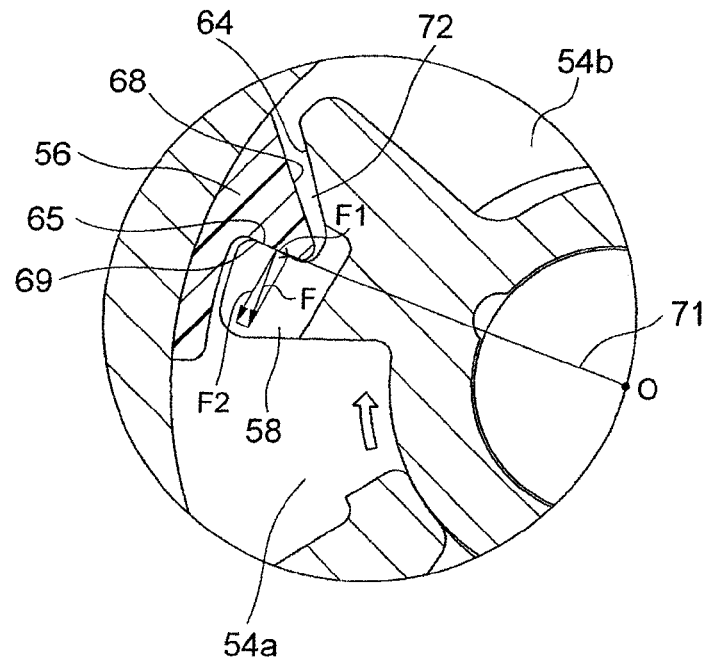

FIGS. 12A and 12B are views each showing details of the valve body engaging portion 60 and the damping-force generating valve body 56. The damping-force generating valve body 56 is formed integral with an arcuate-shaped outer peripheral portion 56a along the inner peripheral surface of the case 51 and a shaft-body fitting portion 56b fitted into a V-shaped groove of the valve body engaging portion 60. The shaft-body fitting portion 56b is fitted into the groove of the valve body engaging portion 60 with a slight clearance therebetween. The valve body engaging portion 60 is formed with a first inclined surface 64 and a second inclined surface 65, which define a groove. The shaft-body fitting portion 56b of the damping-force generating valve body 56 is also formed with first and second inclined surfaces 68, 69, which define a mountain, corresponding to the first and second inclined surfaces 64, 65, respectively, of the valve body engaging portion 60.

As shown in FIG. 12A, when the shaft body 52 is caused to rotate in the counter-clockwise direction, the first inclined surface 64 of the shaft body 52 and the first inclined surface 68 of the damping-force generating valve body 56 abut against each other and the shaft body 52 applies a force F to the damping-force generating valve body 56. The force F is divided into a force component F1 in a direction along the first inclined surface 68 and a force component F2 being perpendicular to the first inclined surface. The first inclined surface 64 is inclined relative to a line 70 connecting between a center O of the shaft body 52 and the first inclined surface 64 so as to apply the outwardly directed force component F1 to the damping-force generating valve body 56. Since the outwardly directed force component F1 is applied on the damping-force generating valve body 56, the damping-force generating valve body 56 moves toward the inner peripheral surface of the case 51 along the first inclined surface 64 of the shaft body 52, so that the damping-force generating valve body 56 comes into close contact with the inner peripheral surface of the case 51. Thereby, the first chamber 54a on the high-pressure side and the second chamber 54b on the low-pressure side are compartmentalized from each other, so that flow of the viscous fluid to the second chamber 54b on the low-pressure side from the first chamber 54a on the high-pressure side is shut off. Therefore, the viscous fluid cannot but flow to the second chamber 54b on the low-pressure side from the first chamber 54a on the high-pressure side via the orifice 57, so that a damping force is generated.

As shown in FIG. 12B, when the shaft body 52 is caused to rotate in the clockwise direction being a reverse direction, then the second inclined surface 65 of the shaft body 52 and the second inclined surface 69 of the damping-force generating valve body 56 abut against each other and the shaft body 52 applies a force F to the damping-force generating valve body 56. The force is likewise divided into a force component F1 in a direction along the second inclined surface 69 and a force component F2 being perpendicular to the second inclined surface 69. The second inclined surface 65 is inclined relative to a line 71 connecting between the center O of the shaft body 52 and the second inclined surface so as to apply the inwardly directed force component F1 to the damping-force generating valve body 56. Since the inwardly directed force component F1 is applied on the damping-force generating valve body 56, the damping-force generating valve body 56 moves toward the center O of the shaft body 52 along the second inclined surface 65 of the shaft body 52. Thereby, a force, with which the damping-force generating valve body 56 pushes the inner peripheral surface of the case 51, decreases or is lost. Therefore, the damping-force generating valve bodies 56 rotate together with the shaft body 52 to enable rotating of the shaft body 52 with a light force even when it slides on the inner peripheral surface of the case 51. Hereupon, the damping-force generating valve bodies 56 may remain in contact with or separate from the inner peripheral surface of the case 51. Also, when the shaft body 52 is caused to rotate in the clockwise direction, a clearance 72 comes into presence between the first inclined surface 68 of the damping-force generating valve bodies 56 and the first inclined surface 64 of the shaft body 52, so that the viscous fluid flows to the first chamber 54a on the low-pressure side from the second chamber 54b on the high-pressure side via the clearance 72 and the notch 58 of the shaft body 52. Therefore, there exists a state in which any damping force is not generated.

That is, when a toilet seat or toilet lid is closed, a damping force is generated whereby the toilet seat or toilet lid can be prevented from striking a Western style toilet bowl abruptly. On the other hand, when the toilet seat or toilet lid should be opened, opening of the toilet seat or toilet lid with a very light force can be achieved without generating any damping force by decreasing or eliminating a force with which the damping-force generating valve body 56 pushes the inner peripheral surface of the case 51.

Figure 6:
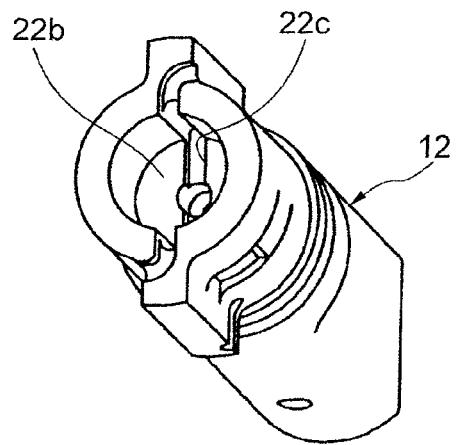
FIG. 6 is a perspective view of a shaft body.
Figure 10B:
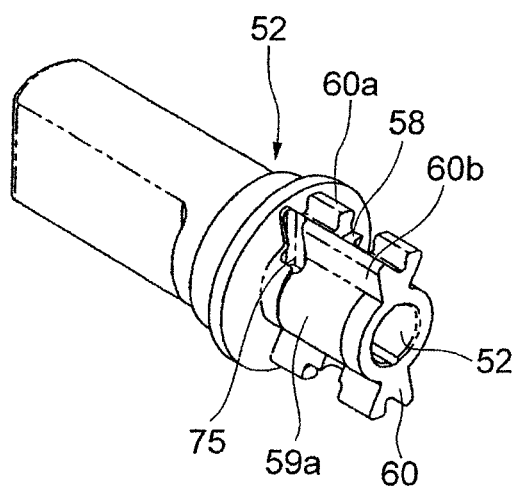
Figure 14:
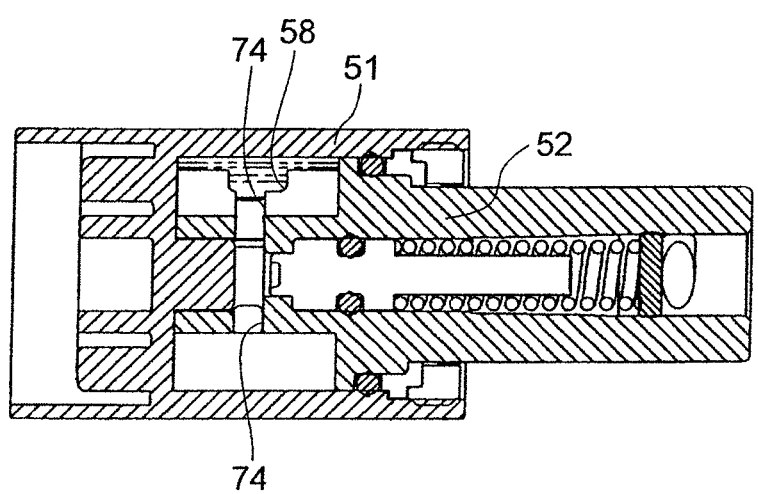
FIG. 14 is a cross-sectional view taken along a line XIV-XIV of FIG. 11A.

According to the above-described first embodiment, as shown in FIG. 6, the S-shaped communicating groove 22*c* as a communicating path for communication between the two first chambers is formed on an end surface of the insertion part 22 of the shaft body 12. In contrast, as shown in FIG. 10A and FIG. 14, according to the second embodiment, a first-chamber communicating hole 74 for communication between the two first chambers 54*a* is formed in the notch 58 of the insertion part 59 of the shaft body 52. The first-chamber communicating hole 74 is formed in a straight manner on one piece 60*a* of the valve body engaging portion 60 of the shaft body 52 so as to extend through the shaft body 52. Also, as shown in FIG. 10B, a second-chamber communicating hole 75 for communication between the two second chambers 54*b* is formed on a base of the insertion part 59 of the shaft body 52. The second-chamber communicating hole 75 is formed in a straight manner on the other piece 60*b* of the valve body engaging portion 60 of the shaft body 52 so as to extend through the shaft body 52.

Figure 13A:
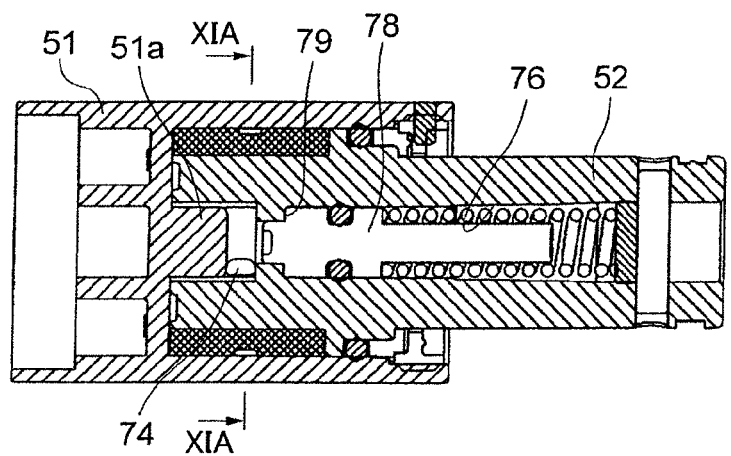
FIGS. 13A and 13B are cross-sectional views of the hinge device taken along the axis of the hinge device (FIG. 13A shows a state before the operation of an overloading preventive valve and FIG. 13B shows a state after the operation of the overloading preventive valve).
Figure 13B:
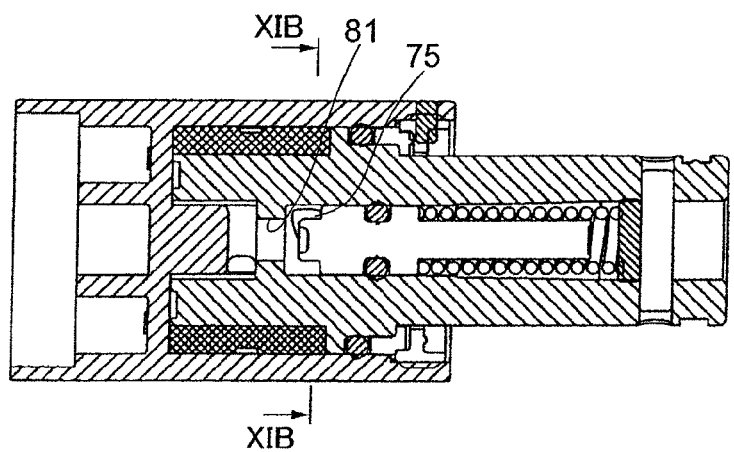

As shown in FIG. 13A, in the same manner as in the hinge device according to the first embodiment, an axially extending space region 76 is formed centrally of the shaft body 52 and an overloading preventive valve 78 is arranged in the space region 76 to be movable in an axial direction. In a state of normal use, in which a damper is made ON, an end of the overloading preventive valve 78 is seated on a valve seat 79 provided on the shaft body 52 to shut off the first-chamber communicating hole 74 and the second-chamber communicating hole 75 (see FIG. 13A). When overloading (forced opening and closing and impulsive opening and closing except loading in normal use) is given and an internal pressure in the first chamber 54*a* on the high-pressure side rises excessively, as shown in FIG. 13B, however, the internal pressure in the first chamber 54*a* on the high-pressure side overcomes a reaction force of the compression spring 31, so that the overloading preventive valve 78 moves to the right in the figure. Thereby, the first chamber 54*a* on the high-pressure side and the second chamber 54*b* on the low-pressure side are coupled to each other by a bypass flow passage 81, so that the viscous fluid filled in the first chamber 54*a* flows to the second chamber 54*b* via the bypass flow passage 81 and the second-chamber communicating hole 75. Therefore, it is possible to prevent the internal pressure in the first chamber 54*a* from excessively rising, which results in protecting the inside mechanism.

As shown in FIG. 9, like the shaft body 12 of the first embodiment, a plurality of flat surfaces 52*b* is formed on the shaft body 52 of the second embodiment so that the shaft body 52 can be rotated together with first or second member. The second embodiment is also similar to the first embodiment in that there are provided a compression coil spring 31 disposed in the space region of the shaft body 52, an O-ring 34 for preventing the viscous fluid, which is filled in the first chambers 54*a*, from leaking to the space region 76 of the shaft body 52, and a pin 36 for preventing the shaft body 52 and the compression coil spring 31 from falling out from the shaft body 52. Accordingly, the compression coil spring, the O-ring, and the pin are denoted by the same reference numerals, and the description thereof will be omitted. In addition, the second embodiment is also similar to the first embodiment in that there are provided an O-ring 25 wound around the shaft body 52, and a cover nut 15 for fixing a bearing 53, which guides the rotational movement of the shaft body 52, to the case 51. Accordingly, the O-ring and the cover nut are denoted by the same reference numerals, and the description thereof will be omitted.

Meanwhile, the invention is not limited to the above-mentioned embodiments, and may have other embodiments without departing from the scope of the invention. For example, the hinge device may be used for not only an opening/closing part of a toilet bowl but also an opening/closing part of a gate or a box of which an upper lid opens. Further, a space region may be formed in not the shaft body but the case, and an overloading preventive valve may be disposed in the space region of the case. Furthermore, since the shaft body is rotated relative to the case, the shaft body may be fixed and the case may be rotated.

Figure 15A:
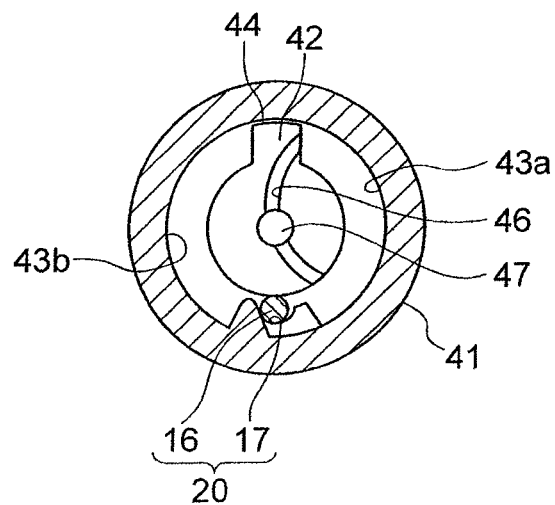
FIGS. 15A and 15B are cross-sectional views of another example of the hinge device (FIG. 15A shows an example where a communicating path is connected to a first chamber at two points and FIG. 15B shows an example where a communicating path is connected to the first chamber at one point).
Figure 15B:
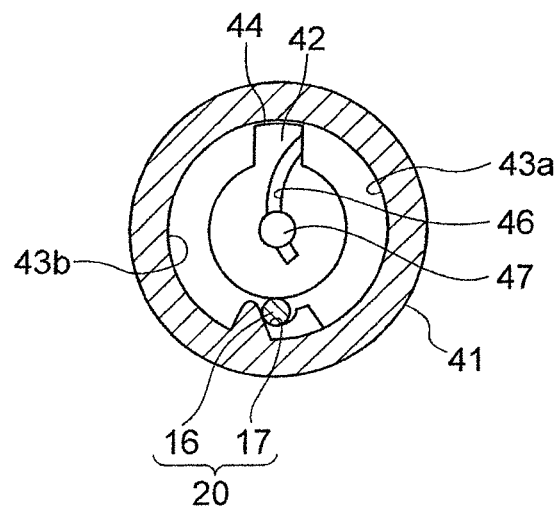
Figure 16A:
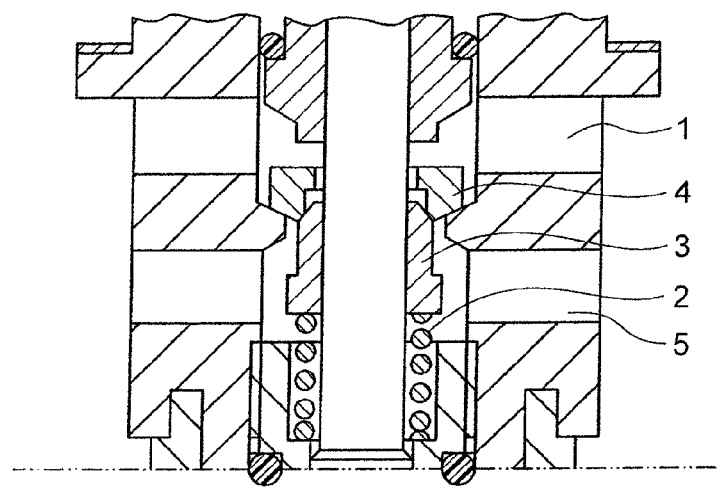
FIGS. 16A and 16B are cross-sectional views of an overloading preventive mechanism of a hinge device in the related art (FIG. 16A shows a state before the operation of an adjustment valve and FIG. 16B shows a state after the operation of the adjustment valve).
Figure 16B:
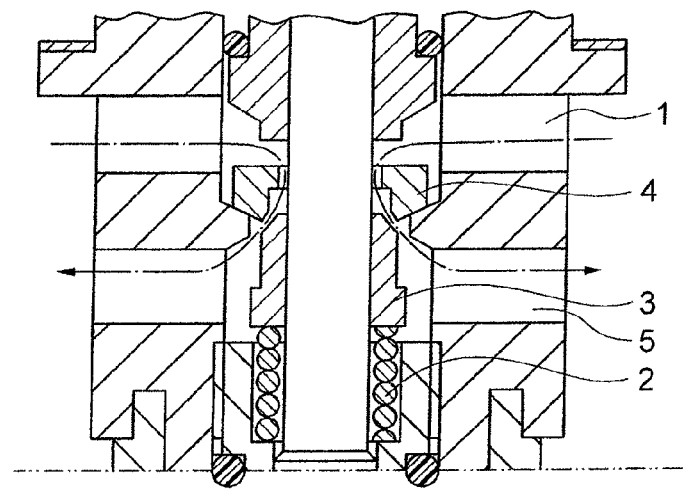

In addition, as shown in FIGS. 15A and 15B, one first chamber 43*a* and one second chamber 43*b* may be formed between the case 41 and the shaft body 42. In this case, one check valve mechanism 20 may be provided. An orifice 44 may be formed between the shaft body 42 and the case 41. Alternatively, a very small hole is formed in the valve 16 of the check valve mechanism 20, and the very small hole may be used as an orifice.

Further, a communicating path 46 may be connected to one chamber at two positions as shown in FIG. 15A, and a communicating path 46 may be connected to one chamber at one position as shown in FIG. 15B (that is, the communicating path may be broken in the middle thereof). However, a valve body 47 needs to face the communicating path 46.

This specification is based on Japanese Patent Application No. 2007-262614 filed with the Japanese Patent Office on Oct. 5, 2007. The entire contents are incorporated herein by reference.

The invention claimed is:

1. A hinge device comprising:
   a case (11, 41, 51);
   a shaft body (12, 52) that is at least partially inserted into the case, and is rotatable relative to the case;
   first and second chambers (14*a*-14*b*, 43*a*-43*b*, 54*a*-54*b*) formed between the case and shaft body;
   viscous fluid that is filled in the first and second chambers formed between the case and the shaft body;
   an orifice (44, 48, 57) that narrows a flow passage of the viscous fluid flowing to the second chamber (14*b*, 43*b*, 54*b*) from the first chamber (14*a*, 43*a*, 54*a*) so as to resist relative rotation of the shaft body when the shaft body is rotated relative to the case;
   a first valve (16, 56) interposed between the shaft body and the case; and
   a second valve (28, 78) that is disposed in a space (26, 76) without the viscous fluid formed in the case or the shaft body, the second valve movable in the space and facing the viscous fluid filled in the first chamber,
   wherein, when the shaft body rotates in a first direction relative to the case, the first chamber on a high-pressure side and the second chamber on a low-pressure side are compartmentalized by the first valve (16, 56) so that the viscous fluid flows to the second chamber on the low-pressure side from the first chamber on the high-pressure side via the orifice and thereby creates a damping force,
   wherein, when the shaft body rotates in a second direction opposite to the first direction relative to the case, the first chamber is reversely positioned on the low-pressure side and the second chamber is positioned on the high-pressure side, the first valve (16, 56) not compartmentalizing the first chamber on the low-pressure side and the second chamber on the high-pressure side from each other so that the viscous fluid flows to the first chamber on the low-pressure side from the second chamber on the high-pressure side without the damping force being generated or with the damping force being reduced, and wherein, when a pressure in the first chamber reaches the predetermined pressure, the second valve (28, 78) moves in the space so that a volume of the first chamber increases and a bypass flow passage (38, 81) connecting the first chamber with the second chamber is formed.

2. The hinge device according to claim 1, further comprising:
   a spring member (31) that is disposed in the space (26, 76), the spring member resisting a force that is generated by the pressure in the first chamber (14a, 43a, 54a) and pushes the second valve (28, 78).

3. The hinge device according to claim 1, wherein when a moving distance of the second valve (28, 78) in the space (26, 76) is smaller than a predetermined distance, the bypass flow passage (38, 81) does not connect the first chamber (14a, 43a, 54a) with the second chamber (14b, 43b, 54b), and when the moving distance of the second valve is equal to or larger than the predetermined distance, the bypass flow passage connects the first chamber with the second chamber.

4. The hinge device according to claim 1, wherein the first valve (56), which is rotated together with the shaft body (52), is provided between an inner surface of the case (51) and the shaft body (52), when the shaft body is rotated relative to the case in the first direction, the shaft body moves the first valve (56) toward the inner surface of the case so that the first valve (56) comes into close contact with the inner surface of the case and the first and second chambers (54a, 54b) are compartmentalized, and when the shaft body is rotated relative to the case in the second direction, the shaft body moves the first valve (56) in a direction where the first valve (56) is separated from the inner surface of the case so that a force of the first valve (56) pushing the inner surface of the case decreases or is lost.

5. The hinge device according to claim 2, wherein when a moving distance of the second valve (28, 78) in the space (26, 76) is smaller than a predetermined distance, the bypass flow passage (38, 81) does not connect the first chamber (14a, 43a, 54a) with the second chamber (14b, 43b, 54b), and when the moving distance of the second valve is equal to or larger than the predetermined distance, the bypass flow passage connects the first chamber with the second chamber.

6. A hinge device comprising:
   a case (51) with a bottom and an inner surface;
   a shaft body (52) having an insertion part (59) thereof inserted into the case (51) and rotatable relative to the case (51);
   a columnar-shaped projection (51a) projecting toward the shaft body (52) formed on the bottom of the case;
   a projection (51b) projecting inside the case from the inner surface of the case;
   a notch (58) provided on insertion part (59) of the shaft body (52);
   a recess (52a) formed on the shaft body (52) and fitted onto the columnar-shaped projection (51a), rotational movement of the shaft body (52) being guided by the columnar-shaped projection (51a);
   an orifice (57) disposed between the projection (51b) projecting inside the case from the inner surface of the case and a portion of the shaft body (52);
   a viscous fluid;
   a first chamber (54a) and a second chamber (54b), formed between the inner surface of the case (51) and the shaft body (52), the first and second chambers (54a,54b) filled with the viscous fluid;
   a first valve (56) interposed between the shaft body (52) and the inner surface of the case (51) and rotates with the shaft body (52);
   a bypass flow passage (81);
   a space (76) formed in the shaft body (52); and
   a second valve (78) disposed in the space (76) without the viscous fluid, the second valve (78) movable in the space (76) and facing the viscous fluid filled in the first chamber (54a), wherein, when the shaft body (52) rotates in a first direction, the first chamber (54a) on a high-pressure side and the second chamber (54b) on a low-pressure side are compartmentalized by the first valve (56) being interposed between the shaft body (52) and the inner surface of the case (51) and rotating together with the shaft body (52) so that the viscous fluid flows to the second chamber (54b) on the low-pressure side from the first chamber (54a) on the high-pressure side via the orifice (57) and thereby creates a damping force, wherein, when the shaft body (52) rotates in a second direction opposite to the first direction, the first chamber (54a) is reversely positioned on the low-pressure side and the second chamber (54b) is positioned on the high-pressure side, the first valve (56) not compartmentalizing the first chamber (54a) on the low-pressure side and the second chamber (54b) on the high-pressure side from each other so the viscous fluid flows to the first chamber (54a) on the low-pressure side from the second chamber (54b) on the high-pressure side via the notch (58) of the shaft body (52) without the damping force being generated or with the damping force being reduced, and wherein, when a pressure in the first chamber (54a) reaches the predetermined pressure, the second valve (78) moves in the space (76) so that a volume of the first chamber (53a) increases and the bypass flow passage (81) connects the first chamber (54a) with the second chamber (54b).

* * * * *

UNITED STATES PATENT AND TRADEMARK OFFICE
CERTIFICATE OF CORRECTION

PATENT NO. : 8,516,657 B2
APPLICATION NO. : 12/681129
DATED : August 27, 2013
INVENTOR(S) : Masahiro Yoshida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this
Fifteenth Day of September, 2015

Michelle K. Lee
*Director of the United States Patent and Trademark Office*